US010116922B2

United States Patent
Huang et al.

(10) Patent No.: US 10,116,922 B2
(45) Date of Patent: *Oct. 30, 2018

(54) METHOD AND SYSTEM FOR AUTOMATIC 3-D IMAGE CREATION

(71) Applicant: Google LLC, Mountain View, CA (US)

(72) Inventors: Jonathan Huang, Santa Clara, CA (US); Samuel Kvaalen, San Francisco, CA (US); Peter Bradshaw, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/289,008

(22) Filed: Oct. 7, 2016

(65) Prior Publication Data

US 2017/0026629 A1    Jan. 26, 2017

Related U.S. Application Data

(63) Continuation of application No. 14/724,292, filed on May 28, 2015, now Pat. No. 9,466,114, which is a (Continued)

(51) Int. Cl.
*G06T 15/00* (2011.01)
*H04N 13/00* (2018.01)
(Continued)

(52) U.S. Cl.
CPC ............ *H04N 13/20* (2018.05); *G03B 35/02* (2013.01); *G06K 9/00* (2013.01); *G06K 9/6215* (2013.01);
(Continued)

(58) Field of Classification Search
CPC . G06T 15/00; G06T 7/00; G06K 9/66; G06K 9/62; G06K 9/00; H04N 13/0221; H04N 13/02; H04N 5/23222
See application file for complete search history.

(56) References Cited

U.S. PATENT DOCUMENTS 5,930,532 A    7/1999  Matsumoto
8,259,161 B1   9/2012  Huang et al.
(Continued)

OTHER PUBLICATIONS

Office Action dated Aug. 19, 2016 in Chinese Patent Application No. 201380018661.0.
(Continued)

*Primary Examiner* — Behrooz Senfi
(74) *Attorney, Agent, or Firm* — Byrne Poh LLP (57) ABSTRACT

Disclosed herein are methods, devices, and non-transitory computer readable media that relate to stereoscopic image creation. A camera captures an initial image at an initial position. A target displacement from the initial position is determined for a desired stereoscopic effect, and an instruction is provided that specifies a direction in which to move the camera from the initial position. While the camera is in motion, an estimated displacement from the initial position is calculated. When the estimated displacement corresponds to the target displacement, the camera automatically captures a candidate image. An acceptability analysis is performed to determine whether the candidate image has acceptable image quality and acceptable similarity to the initial image. If the candidate image passes the acceptability analysis, a stereoscopic image is created based on the initial and candidate images.

18 Claims, 6 Drawing Sheets

Related U.S. Application Data continuation of application No. 14/206,901, filed on Mar. 12, 2014, now Pat. No. 9,071,827, which is a continuation of application No. 13/601,845, filed on Aug. 31, 2012, now Pat. No. 8,711,209, which is a continuation of application No. 13/366,709, filed on Feb. 6, 2012, now Pat. No. 8,259,161.

(51) Int. Cl.

| | | |
|---|---|---|
| *H04N 13/20* | (2018.01) | |
| *H04N 13/156* | (2018.01) | |
| *H04N 13/221* | (2018.01) | |
| *G06T 7/00* | (2017.01) | |
| *H04N 13/02* | (2006.01) | |
| *G03B 35/02* | (2006.01) | |
| *G06K 9/00* | (2006.01) | |
| *G06T 15/20* | (2011.01) | |
| *G06T 7/593* | (2017.01) | |
| *G06T 7/285* | (2017.01) | |
| *G06K 9/62* | (2006.01) | |
| *G06K 9/66* | (2006.01) | |
| *G06T 7/70* | (2017.01) | |

(52) U.S. Cl.
CPC .................. *G06K 9/66* (2013.01); *G06T 7/00* (2013.01); *G06T 7/285* (2017.01); *G06T 7/593* (2017.01); *G06T 7/70* (2017.01); *G06T 15/205* (2013.01); *H04N 13/004* (2013.01); *H04N 13/02* (2013.01); *H04N 13/0221* (2013.01); *H04N 13/156* (2018.05); *H04N 13/221* (2018.05); *G06T 2200/24* (2013.01); *G06T 2207/20092* (2013.01); *G06T 2207/20221* (2013.01); *G06T 2207/30244* (2013.01); *H04N 2213/003* (2013.01)

(56) References Cited

U.S. PATENT DOCUMENTS

| | | | |
|---|---|---|---|
| 8,711,209 B2 | 4/2014 | Huang et al. | |
| 2008/0297502 A1 | 12/2008 | Simard et al. | |
| 2010/0303340 A1* | 12/2010 | Abraham | G06T 7/285 |
| | | | 382/154 |
| 2011/0080466 A1 | 4/2011 | Kask et al. | |
| 2011/0135006 A1* | 6/2011 | Yamamoto | H04N 19/105 |
| | | | 375/240.16 |
| 2011/0141227 A1* | 6/2011 | Bigioi | H04N 13/0007 |
| | | | 348/36 |
| 2011/0157017 A1* | 6/2011 | Webb | A63F 13/06 |
| | | | 345/158 |
| 2011/0193941 A1 | 8/2011 | Inaba et al. | |
| 2011/0255775 A1* | 10/2011 | McNamer | H04N 13/0221 |
| | | | 382/154 |
| 2012/0002019 A1 | 1/2012 | Hashimoto | |
| 2012/0020524 A1* | 1/2012 | Ishikawa | H04N 7/183 |
| | | | 382/103 |
| 2012/0280989 A1 | 11/2012 | Birtwistle et al. | |
| 2012/0314036 A1 | 12/2012 | Dahi et al. | |
| 2013/0155049 A1* | 6/2013 | Marsan | G09G 5/08 |
| | | | 345/419 |
| 2015/0103149 A1* | 4/2015 | McNamer | H04N 5/23293 |
| | | | 348/50 |
| 2015/0375013 A1* | 12/2015 | Lachaine | A61B 8/085 |
| | | | 600/439 |

OTHER PUBLICATIONS

International Search Report & Written Opinion of the International Search Authority dated Aug. 14, 2013 for Intenrational Patent Application No. PCT/US2013/023489.
Notice of Allowance dated Mar. 2, 2015 for U.S. Appl. No. 14/206,901.
Office Action dated Feb. 3, 2016 in Chinese Patent Application No. 201380018661.0.
Office Action dated May 16, 2016 in U.S. Appl. No. 14/724,292.
Office Action dated Aug. 8, 2016 in European Patent Application No. 13702870.0.
Office Action dated Sep. 15, 2015 in European Patent Application No. 13702870.0.
Office Action dated Oct. 8, 2015 in U.S. Appl. No. 13/601,845.
Office Action dated Oct. 8, 2015 in U.S. Appl. No. 14/206,901.
Office Action dated Oct. 8, 2015 in U.S. Appl. No. 14/724,292.
Office Action dated Oct. 9, 2014 in European Patent Application No. 13702870.0.
Office Action dated Aug. 14, 2014 in U.S. Appl. No. 14/206,901.
Office Action dated Aug. 15, 2014 in U.S. Appl. No. 13/601,845.
WikiHow, "How to Take 3D Photos", available at: http://www.wikihow.com/Take-3D-Photos, last accessed Sep. 6, 2011, pp. 1-3.
International Preliminary Report on Patentability dated Aug. 12, 2014 in International Patent Application No. PCT/US2013/023489.
Notice of Allowance dated May 9, 2012 in U.S. Appl. No. 13/366,709.
Notice of Allowance dated Jun. 8, 2016 in U.S. Appl. No. 14/724,292.
Notice of Allowance dated Dec. 12, 2013 in U.S. Appl. No. 13/601,845.
Office Action dated Aug. 15, 2013 in U.S. Appl. No. 13/601,845.

* cited by examiner

METHOD AND SYSTEM FOR AUTOMATIC 3-D IMAGE CREATION

CROSS-REFERENCE TO RELATED APPLICATIONS

This application is a continuation of U.S. patent application Ser. No. 14/724,292, filed May 28, 2015, which is a continuation of U.S. patent application Ser. No. 14/206,901, filed Mar. 12, 2014, which is a continuation of U.S. patent application Ser. No. 13/601,845, filed Aug. 31, 2012, which is a continuation of Ser. No. 13/366,709, filed Feb. 6, 2012, each of which is hereby incorporated by reference herein in its entirety.

TECHNICAL FIELD

This disclosure relates generally to image creation, and more particularly to stereoscopic image creation.

BACKGROUND

To create a stereoscopic 3-D image, two images of a scene are taken at two different locations. In a conventional approach, the two different locations correspond to the locations of two different lenses, which could be on either the same camera or on two different cameras. Thus, 3-D images have traditionally been taken using specialized cameras, such as a camera that has two different lenses and two different image sensors.

With the increasing number of display devices, such as televisions, computer monitors, and smartphones, being able to display 3-D images, there is an interest in making 3-D image creation more accessible to the average user. However, a camera that is equipped with two lenses and two image sensors for 3-D picture taking is likely to be substantially more expensive than a conventional camera that has a single lens and a single image sensor. In addition, many users may be hesitant to purchase a new camera just for 3-D image creation. Thus, there is a need to provide methods and systems that enable a user to create 3-D images using a single lens and a single image sensor.

SUMMARY

In a first aspect, a method for stereoscopic image creation is provided. The method includes a capturing an initial image using a camera at an initial position. The method further includes determining a target displacement from the initial position for a desired stereoscopic effect. The method additionally includes providing an instruction that specifies a direction in which to move the camera from the initial position. The method also includes while the camera is in motion, estimating an estimated displacement from the initial position. The method further includes in response to determining that the estimated displacement corresponds to the target displacement, the camera automatically captures a candidate image. The method also includes in response to capturing the candidate image, automatically performing an acceptability analysis. The acceptability analysis includes analyzing the candidate image to determine whether the candidate image has acceptable image quality and comparing the candidate image to the initial image to determine whether the candidate image has acceptable similarity to the initial image. Yet further, the method includes in response to determining that the candidate image has acceptable image quality and has acceptable similarity to the initial image, automatically creating a stereoscopic image based on the initial image and the candidate image.

In a second aspect, a device is provided. The device includes an image sensor, a user interface, and a controller. The controller is configured to: (a) capture an initial image using the image sensor when the device is at an initial position; (b) determine a target displacement from the initial position for a desired stereoscopic effect; (c) provide an instruction through the user interface, wherein the instruction specifies a direction in which to move the device from the initial position; (d) while the device is in motion, estimate a displacement of the device from the initial position; (e) in response to determining that the estimated displacement corresponds to the target displacement, automatically capture a candidate image using the image sensor; (f) in response to capturing the candidate image, automatically perform an acceptability analysis that includes analyzing the candidate image to determine whether the candidate image has acceptable image quality and comparing the candidate image to the initial image to determine whether the candidate image has acceptable similarity to the initial image; and (g) in response to determining that the candidate image has acceptable image quality and has acceptable similarity to the initial image, automatically create a stereoscopic image based on the initial image and the candidate image.

In a third aspect, a non-transitory computer readable medium is provided. The non-transitory computer readable medium has stored therein instructions that are executable by a computing device that includes an image sensor and a user interface, to cause the computing device to perform functions. The functions include: (a) capturing an initial image using the image sensor when the computing device is at an initial position; (b) determining a target displacement from the initial position for a desired stereoscopic effect; (c) providing an instruction through the user interface, wherein the instruction specifies a direction in which to move the computing device from the initial position; (d) while the computing device is in motion, estimating a displacement of the computing device from the initial position; (e) in response to determining that the estimated displacement corresponds to the target displacement, automatically capturing a candidate image using the image sensor; (f) in response to capturing the candidate image, automatically performing an acceptability analysis that includes analyzing the candidate image to determine whether the candidate image has acceptable image quality and comparing the candidate image to the initial image to determine whether the candidate image has acceptable similarity to the initial image; and (g) in response to determining that the candidate image has acceptable image quality and has acceptable similarity to the initial image, automatically creating a stereoscopic image based on the initial image and the candidate image.

DETAILED DESCRIPTION

In the following detailed description, reference is made to the accompanying figures, which form a part thereof. In the figures, similar symbols typically identify similar components, unless context dictates otherwise. The illustrative embodiments described in the detailed description and figures are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Overview

Three-dimensional (3-D) imaging records visual information in a scene with regard to all three dimensions of space. Such 3-D imaging may be used, for example, to provide the illusion of depth and/or to provide a full spatial map of an object or location. Standard two-dimensional (2-D) imaging techniques can provide similar depth cues in a single 2-D image, for instance by taking advantage of foreground/background elements, depth of field, focus point depth, and other known techniques in 2-D photography. However, 3-D images can provide further viewing realism and more complete data about the spatial content of a scene when compared to 2-D-only imaging.

Several techniques are possible to record 3-D images. One such technique is stereoscopy, where at least two different 2-D images, each with a different perspective of a scene, are combined to create a 3-D image that includes depth information.

Although stereoscopic imaging can provide a viewer with depth information about a scene, it may not necessarily provide a 'true' 3-D image of the scene and/or subject. That is, the combination of two 2-D images usually does not provide sufficient information to build a complete 3-D image of a scene and/or a subject. In many situations, stereoscopic imagery may be more accurately termed, 'pseudo 3-D imagery'. Accordingly, within the context of this description, references to '3-D imagery' and other similar terms should be understood as corresponding to references to 'pseudo-3-D stereoscopic imagery'.

The 2-D images used to form the combined 3-D image can be obtained in a variety of ways. For instance, two cameras could each capture single images from different positions or a single camera could be used to capture a first and a second image, each image from a different position. Alternatively, a stereo camera could be used to capture images of the scene using at least two image sensors and corresponding optics. The 2-D images can be captured simultaneously or in a successive fashion. Alternatively, the 2-D images can be captured with some time period between frames, for instance in a time-lapse situation.

Traditionally, the sideways shift (also known in the art as the base line) between the first and second image capture locations is similar to the interocular distance in humans, or about 65 mm. Stereoscopic images generated from a ~65 mm base line may appear similar to how a person may actually view the real world environment. In other words, it may feel to the person viewing the stereoscopic image as if they were actually in the as-captured environment. This 'lifelike' approach to stereoscopy is known as ortho stereo'.

Other stereoscopy techniques suggest a base line of approximately $\frac{1}{30}^{th}$ of the distance to the closest subject for more impactful 3-D effects. For instance, to capture the 3-D effect of a building 100 meters away, the stereophotographer may choose a base line (sideways shift) of ~3.3 meters. The technique of using a relatively long base line is known in the art as 'hyper stereo'. Other base lines are possible and are used in the art.

In practice, the baseline distance and direction may depend at least upon the size and depth/distance characteristics of the image subject, scene/subject composition, as well as any particular information that may need to be recorded (e.g. a particular 3-D aspect of the image subject to be captured).

Once the two 2-D images are captured, they can be combined in several different ways in order to create the stereoscopic 3-D image. In one example, a red-cyan anaglyph, the first 2-D image could be a black and white image tinted with a red color. The second 2-D image could be similarly tinted with a cyan (blue) color. The tinted first and second images could be overlaid upon one another and viewed with red-cyan glasses (3-D glasses). The filters on the red-cyan glasses cause one eye of the glasses-wearer to see substantially only the first image, while the other eye of the wearer can see substantially only the second image. In this manner, a stereoscopic 3-D image can be formed from two shifted 2-D images in an effort to simulate a 3-D scene.

In another example, the two captured 2-D images could be combined into a stereoscopic image by assigning different polarizations to each 2-D image. When displayed, the viewer may be able to observe the pseudo-3D stereo image using polarizing glasses. Other formats for combining the captured 2-D images to display pseudo-3-D images are possible. Corresponding methods for viewing each pseudo-3-D image format are possible and vary widely. Examples of 3-D content viewing methods include anachrome (red/cyan) glasses, liquid crystal shutter glasses, linearly/circularly polarized glasses, and autostereoscopy, where different images may be presented to each eye of the viewer without the need for other headgear.

A method, apparatus and a set of functions that may be stored in a non-transitory computer readable medium are described herein. Specifically described is an automatic way to acquire pseudo-3-D information using a plurality of 2-D images. The initial (first) and candidate (second) 2-D images may be captured using a camera, such as may be found on a mobile device like a cellphone or tablet device.

When an initial image is captured, a determination may be made regarding a target displacement, or base line, needed for a desired stereoscopic effect. A user could move the device the distance corresponding to the target displacement from the initial position in response to, for instance, a notification from the camera device or other associated device. A positioning system may provide information regarding the location and/or movement of the camera. A candidate image could be captured automatically upon sensing the camera has moved the prescribed distance and direction or, alternatively, in response to a user interaction.

Upon candidate image capture, an acceptability analysis of the candidate image could be performed to determine if the candidate image exhibits sufficient image quality and similarity to the initial image. Such image quality analysis could involve various aspects of the candidate image, such as determining if the image is blurry (e.g. due to motion), grainy, out of focus, poorly-lit, among the examples of possible evaluative criteria. The similarity of the candidate image with respect to the initial image could be analyzed in order to determine if the initial image subject is, for example, still in the candidate image. Other image similarity criteria are possible. Further, the candidate image could be evaluated to determine if sufficient 3-D effect will result from the combination of the initial and the candidate images. If the candidate image fails to possess sufficient image quality and/or sufficient similarity to the initial image, a new candidate image may be acquired or other functions may be initiated, requested, or performed.

If the candidate image has sufficient image quality and similarity to the initial image, the initial and candidate images may be combined to create a stereoscopic image.

It will be clear to those skilled in the art that there are many ways to implement such a method and apparatus using a camera or other imaging device. As such, the following example embodiments are not meant to preclude any such alternate implementations and embodiments, which are implicitly contemplated herein.

Apparatus for Automatic 3-D Image Creation

Figure 1:
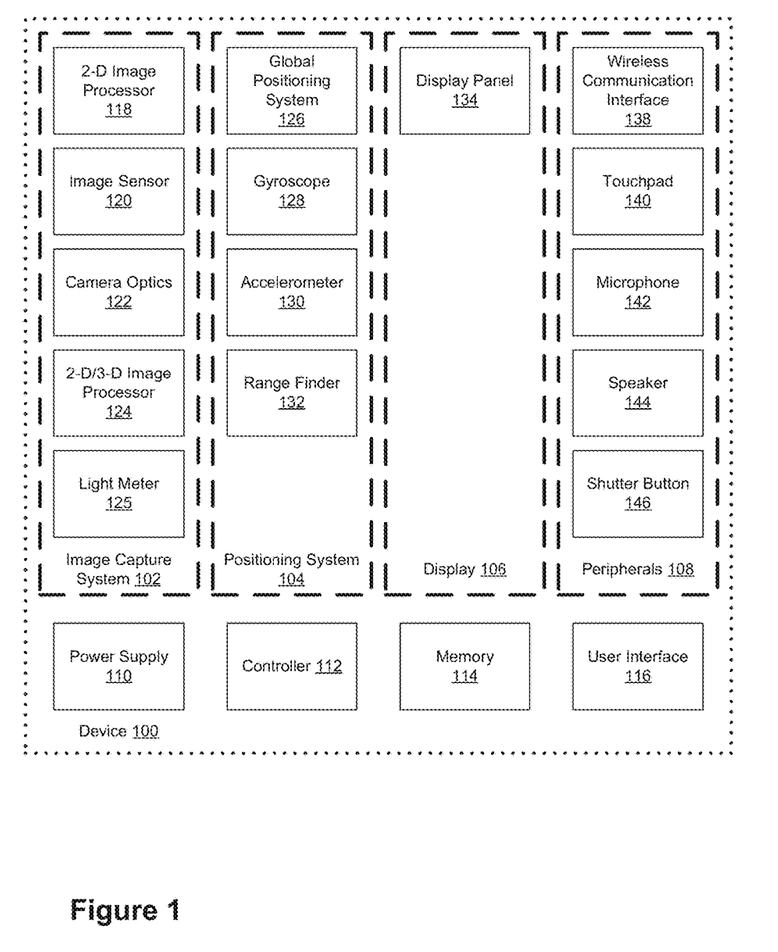
FIG. 1 is a schematic diagram of a device, in accordance with an example embodiment.

FIG. 1 is a schematic diagram of a device 100 that may include several different components and subsystems. In an example embodiment, device 100 could include subsystems such as an image capture system 102, a positioning system 104, display 106, and peripherals 108, as well as a power supply 110, a controller 112, a memory 114, and a user interface 116.

The image capture system 102 may include components such as a 2-D image processor 118, an image sensor 120, camera optics 122, a 2-D/3-D image processor 124, and a light meter 125. The positioning system 104 may include components such as a global positioning system (GPS) transceiver 126, a gyroscope 128, an accelerometer 130, and a range finder 132. The display 106 could include a display panel 134 and the peripherals 108 could include a wireless communication interface 138, a touchpad 140, a microphone 142, a speaker 144, and a shutter button 146.

Device 100 could represent a still camera, a video camera, a cell phone, a web cam, a tablet device, or any other image capture device known in the art. Further, device 100 could be part of a wearable computing system and/or integrated into any number of computing devices known in the art. Device 100 could be mounted to a moving or fixed platform. For instance, device 100 could be mounted to a vehicle in an effort to obtain pseudo-3-D maps of buildings, roads, and other real world objects.

Alternatively, device 100 could be used in 3-D machine vision. For example, various embodiments of device 100 could be implemented with a robotic control system or in an autonomous vehicle to provide pseudo-3-D information.

The power supply 110 may provide power to various components of device 100 and could represent, for example, a rechargeable lithium-ion battery. Other power supply materials and types known in the art are possible.

Many of the functions of device 100 could be controlled by controller 112. Controller 112 may include one or more processors (such as microprocessors) that execute instructions stored in a non-transitory computer readable medium, such as the memory 114. Controller 112 could control the user interface 116 to adjust images and other content displayed on the display panel 134. The controller 112 could also control the image capture system 102 and various other components of device 100. The controller 112 may also represent a plurality of computing devices that may serve to control individual components or subsystems of the device 100 in a distributed fashion.

In addition to instructions, the memory 114 may store data such as previously captured 2-D and 3-D images and information regarding base lines used to achieve certain 3-D effects. Thus, the memory 114 may function as a data store of information related to 3-D imagery and stereophotography. Such information may be used by device 100 and controller 112 at various points during the stereographic image creation and display process.

The device 100 may include a user interface 116 for providing information to or receiving input from a user of device 100. The user interface 116 could control or enable control of content and/or the layout of interactive images that could be displayed on display panel 134. Further, the user interface 116 could include one or more input/output devices within the set of peripherals 108, such as touchpad 140, microphone 142, and speaker 144. The controller 112 may control the function of the device 100 based on inputs received through the user interface 116. For example, the controller 112 may utilize user input from the user interface 116 to control when the image capture system 102 should take an initial image.

The image capture system 102 could include several components similar to those that may be found in a digital camera. Specifically, the image capture system 102 may include various camera optics 122 configured to provide a field of view to the image sensor 120. The image capture system 102 could also include various other processors configured at least to manipulate image data between various formats and create 2-D and/or 3-D image files. These could include the 2-D image processor 118 and the 2-D/3-D image processor 124. The image capture system 102 could further include the light meter 125, which could be configured to provide ambient light measurements to controller 112. The ambient light measurements could be used to set exposure parameters that may include ISO, shutter speed and aperture settings for use when capturing the initial and candidate images. Further, the user interface 116 could act responsively to ambient light measurements. For example, the user interface 116 could request, provide instructions for, or otherwise alert the user to hold the camera steady during image capture if the ambient light level is determined to be low.

The positioning system 104 could be configured to provide data related to the current position and the current orientation of the device 100 to the controller 112. This position and orientation data may help ascertain the lateral shift, or base line, needed to generate the stereographic image and also may be used to determine when the device 100 has been displaced to the correct candidate image location.

The global positioning system (GPS) transceiver 126 could be a receiver that obtains clock and other signals from GPS satellites and may be configured to provide real-time location information to the controller 112. The gyroscope 128 could be a microelectromechanical system (MEMS) gyroscope, a fiber optic gyroscope, or another type of gyroscope known in the art. The gyroscope 128 may be configured to provide orientation information to the controller 112. The positioning system 104 could further include an accelerometer 130 configured to provide motion input data to the controller 112. The accelerometer 130 could be one or any combination of known accelerometer types known in the art such as piezoelectric, optical, resistive, capacitive, shear mode, strain gauge, surface acoustic wave, laser, MEMS, etc.

A range finder 132 could be included in the positioning system 104. In some example embodiments, the range finder 132 could be used to determine the distance to a target object. In such embodiments, the distance information could be used to determine proper focus for the camera optics 122 and determine the base line needed to achieve sufficient 3-D effect in the stereographic image of a particular scene. For instance, the range finder 132 could generate a rough depth map of a scene using, for instance, an ultrasonic or infrared illuminator and detector. The depth map could be created by an autofocus routine and may include preliminary distance and size data about a scene, which could be utilized by controller 112 in conjunction with memory 114 to estimate a base line (or target displacement) and a displacement direction. The range finder 132 could include any known means for range-finding, such as LIDAR, RADAR, a microwave rangefinder, etc.

The aforementioned target object could be identified within a scene using several different techniques. For instance, the user could move the target object to a specific location within the field of view of the image capture system, similar to utilizing a fixed focus spot on an autofocus camera. In other embodiments, the target object could be selected by a manual user input via the touchpad 140. Alternatively, the target object could be determined automatically depending upon, for instance, the rangefinder data and/or the content of the initial image.

The display 106 could include a display panel 134. The display 106 could be configured to provide a variety of graphics to a user of device 100. For instance, the display 106 could function as a part of user interface 116 to display images, text, menus, and instructions to the user.

The device 100 may include a set of peripherals 108 that could be configured to provide input and output to and from a user of device 100. In one example, the device 100 may include a wireless communication interface 138 for wirelessly communicating with one or more devices directly or via a communication network. For example, wireless communication interface 138 could use 3G cellular communication, such as CDMA, EVDO, GSM/GPRS, or 4G cellular communication, such as WiMAX or LTE. Alternatively, wireless communication interface 138 could communicate with a wireless local area network (WLAN), for example, using WiFi. In some embodiments, wireless communication interface 138 could communicate directly with a device, for example, using an infrared link, Bluetooth, or ZigBee.

The shutter button 146 could be used by a user of the device 100 to manually capture an initial image. Alternatively, the shutter button 146 could be depressed by mechanical means. In some embodiments, the device 100 may not have a shutter button 146. For instance, the capture of 3-D stereographic images could be fully automated or initiated in another way, for example in response to a voice command via the microphone 142, a touch input using the touchpad 140, or a remote device communicating with the device 100 via the wireless communication interface 138.

The components of the device 100 may be configured to work in an interconnected fashion with other components within or outside their respective systems. For instance, in an example embodiment, a user of the device 100 may press the shutter button 146 while the device 100 is in a 3-D image capture mode. In response to the user input, the range finder 132 could determine the range to a relevant target object within the field of view of the camera optics 122. The camera optics 122 could autofocus on the target object. The light meter 125 may be controlled by the controller 112 to set the correct exposure based at least on ambient lighting conditions and various characteristics of the camera optics 122 and the image sensor 120, such as aperture and ISO settings. In response to setting the correct exposure, the image sensor 120 may be controlled by the controller 112 to capture an initial image. The raw data from the image sensor 120 may be transmitted to the 2-D image processor 118 in order to convert the raw image file to a compressed image format, such as the Joint Photographic Experts Group (JPEG) standard file format. The initial image JPEG may be transmitted to the display panel 134 for image preview/display.

Upon initial image capture, the controller 112 may determine a base line distance and direction to displace the device 100 to achieve a desired stereoscopic effect. For example, a user may be presented a set of stereoscopic effects by the user interface 116. In order to select from the set (which may include ortho stereo, hyper stereo, and/or other options), the user may interact with device 100 using the touchpad 140, the microphone 142 (e.g. with a voice command), and/or any other form of input to device 100. The aforementioned ortho stereo' effect could provide a realistic pseudo-3-D view of a scene, such as a person may experience if actually in the as-imaged environment. The 'hyper stereo' effect could provide a 'miniaturized' version of distant, large objects such as buildings and landscapes. Other stereoscopic effects could be offered as options to the user of device 100. Alternatively, the controller 112 could automatically select a particular stereoscopic effect based on, for instance, target object distance and size. In other embodiments, the device 100 may be configured to capture images using one particular stereoscopic effect.

Each stereoscopic effect requires the initial and candidate images to be separated by a shift of perspective with respect to the target object that may correspond to a particular base line distance and direction. The combination of the base line distance and direction can be termed the target displacement. The controller 112 could look up specific information regarding suggested or previously used target displacements using the memory 114 and determine an appropriate target displacement for the particular imaging scenario, depending at least on the selected stereoscopic effect. The device 100 could be moved to the determined target displacement position manually (e.g. by the user) or automatically, for instance if the device is mounted on a robotic arm, platform, or track that may be controlled by the device 100.

When the device 100 reaches an exact or approximate position as shifted by the target displacement, a candidate image may be captured automatically by the image capture system 102 or manually by the user. In response, various elements of device 100 at least including the controller 112 and memory 114 could analyze the candidate image using various image quality and image similarity criteria. The image quality criteria could include focus, depth of field, exposure, contrast, and other factors. The image similarity criteria may include a comparison of the initial and candidate images, for example, to determine if the stereoscopic 3-D effect is within a desirable range and/or to determine if the image composition has changed significantly (e.g. whether the target object is in the frame). Other image quality and image similarity criteria are possible within the context of analyzing two still images for use in the creation of a stereoscopic image.

If, after the aforementioned image analysis, the candidate image conforms to image quality and image similarity criteria, the candidate image may be deemed an acceptable candidate image. Otherwise, the candidate image may be deemed unacceptable and further functions, such as recapture of an initial and/or a candidate image may occur.

Upon acceptable candidate image capture, the 2-D/3-D image processor 124 could use a number of potential image processing techniques to form a 3-D image from the plurality of 2-D images. These techniques may depend at least upon how the 3-D images will be displayed. For instance, the 2-D/3-D image processor 124 could use information from the plurality of 2-D images and the range finder 132 in order to build up a layered or depth-mapped 3-D image for display on a "2-D plus depth" display. The 3-D image could be converted to and used, within the context of this invention, in various image file formats, which may depend on how the image may be eventually viewed.

Further, the 2-D/3-D image processor 124 could create a 3-D image in a format intended for display on a standard 2-D display or on a display specifically configured to display 3-D image formats. For example, an anaglyph image transposition or a stereogram could be created from the plurality of 2-D images that may deliver a 3-D-like effect using a 2-D display. A variety of 3-D image formats are known in the art for the display of pseudo-3-D imagery and are all possible within the scope of this invention and contemplated herein.

Although FIG. 1 shows various components of device 100, i.e., wireless communication interface 138, controller 112, memory 114, image sensor 120, GPS transceiver 126, and user interface 116, as being integrated into the device 100, one or more of these components could be mounted or associated separately from the device 100. For example, image sensor 120 could be mounted separately from the device 100. Thus, the device 100 could be provided in the form of device elements that may be located separately or together. The device elements that make up device 100 could be communicatively coupled together in either a wired or wireless fashion.

Figure 2:
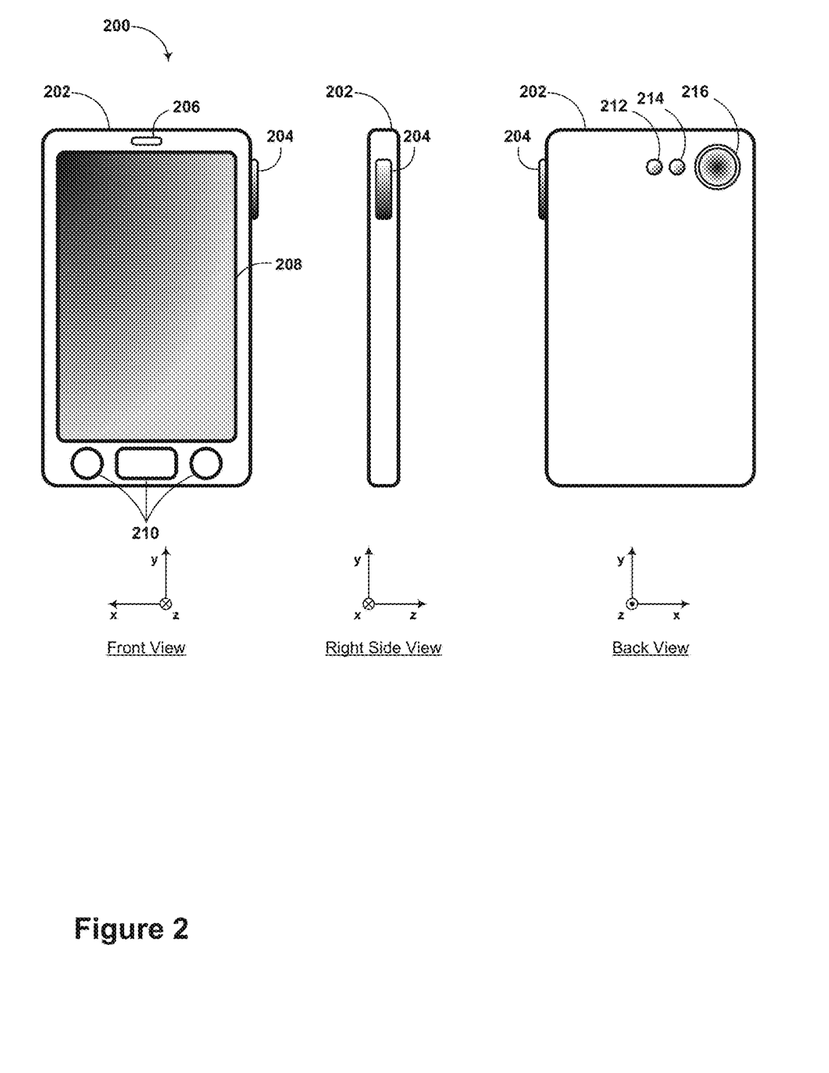
FIG. 2 is a front, side, and back view of a phone, in accordance with an example embodiment.

FIG. 2 illustrates a front, side and back view of a phone 200 that could be one embodiment of the device 100 that is described above and shown in FIG. 1. Phone 200 could include various elements, such as a body 202, a shutter button 204, a speaker/microphone 206, a display 208, and other buttons 210. The device 200 could further include a range finder 212, an illuminator 214 and a camera 216.

In the example embodiment, the range finder 212 could be an ultrasonic rangefinder or infrared rangefinder, but other types of rangefinders known in the art are possible.

The illuminator 214 could represent an infrared light-emitting diode (LED) to assist with autofocus. Alternatively or additionally, the illuminator 214 could serve to provide direct lighting during image capture with camera 216. For instance, the illuminator 214 could provide flash or constant illumination of the scene.

In one embodiment, the camera 216 could include an image sensor and associated optical elements such as lenses. The camera 216 could offer zoom capabilities or could have a fixed focal length lens. In other embodiments, interchangeable lenses could be used with camera 216.

The camera 216 could have a variable mechanical aperture and/or the camera 216 could include an electronic shutter. The camera 216 could be configured to capture still images, video images, or both.

Those skilled in the art will understand that there are a variety of apparatuses that could be used to capture 2-D images for creating 3-D stereoscopic images. The aforementioned example embodiment is not intended to bar the use of any other such examples which could be reasonably applied within the context of this invention.

Method for Automatic 3-D Image Creation

A method is provided for automatically capturing and creating 3-D images. The method could be performed using an apparatus shown in FIG. 1 and FIG. 2 and as described above, however, other configurations could be used. FIG. 4 illustrates the steps in an example method 400; however, it is understood that in other embodiments, the steps may appear in different order and steps may be added or subtracted. Further, the method 400 is specifically described with reference to FIGS. 3A, 3B, and 3C. However, other example embodiments are possible within the context of the method 400.

Method step 402 includes selecting a 3-D capture mode. For example, a user could access a menu in the user interface of the image capture device in order to set such a 3-D capture mode. Alternatively, the user could turn a dial or push a button that may correspond to setting the appropriate capture mode. The image capture device may alternatively or additionally select or enter into 3-D capture mode in response to other input or triggers. In other embodiments, the image capture device may remain permanently in a 3-D capture mode, for instance if the device is configured to only generate stereoscopic 3-D images.

Figure 3A:
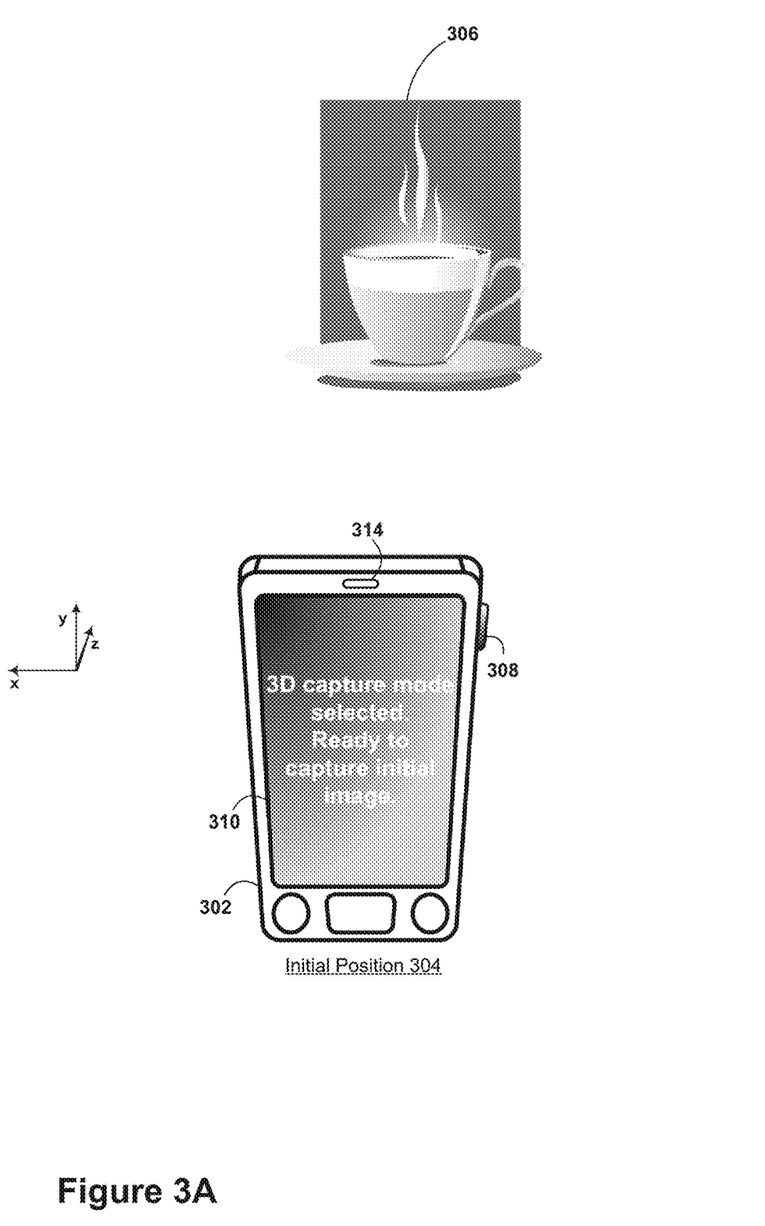
FIG. 3A is a perspective view of an image capture scenario in accordance with an example embodiment.
Figure 4:
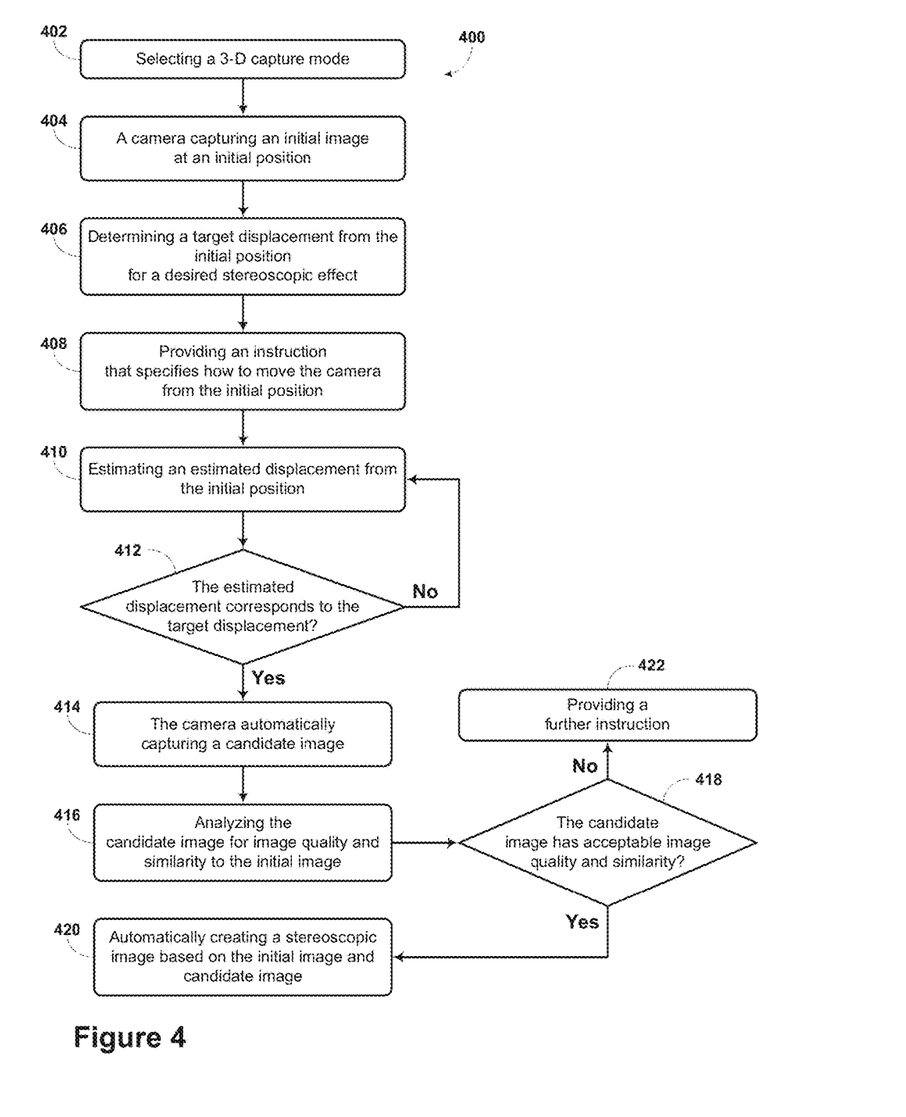
FIG. 4 is a flowchart of a method, in accordance with an example embodiment.

Method step 402 can be illustrated as shown in FIG. 3A. In the example embodiment, a phone 302 may include a shutter button 308, a display 310, a speaker/microphone 314, and a camera (not shown). The phone 302 may be in the local environment of a cup of coffee 306. In response to the user selecting a 3-D capture mode, the phone 302 may display text stating, "3D capture mode selected. Ready to capture initial image."

In method step 404, the camera captures an initial image at an initial position 304. This step may be initiated manually by a user pushing the shutter button 308 or a soft key. Alternatively, the step could be carried out automatically based on a specific schedule, a specific time interval, a specific position/orientation of the camera, among other triggers.

Figure 3B:
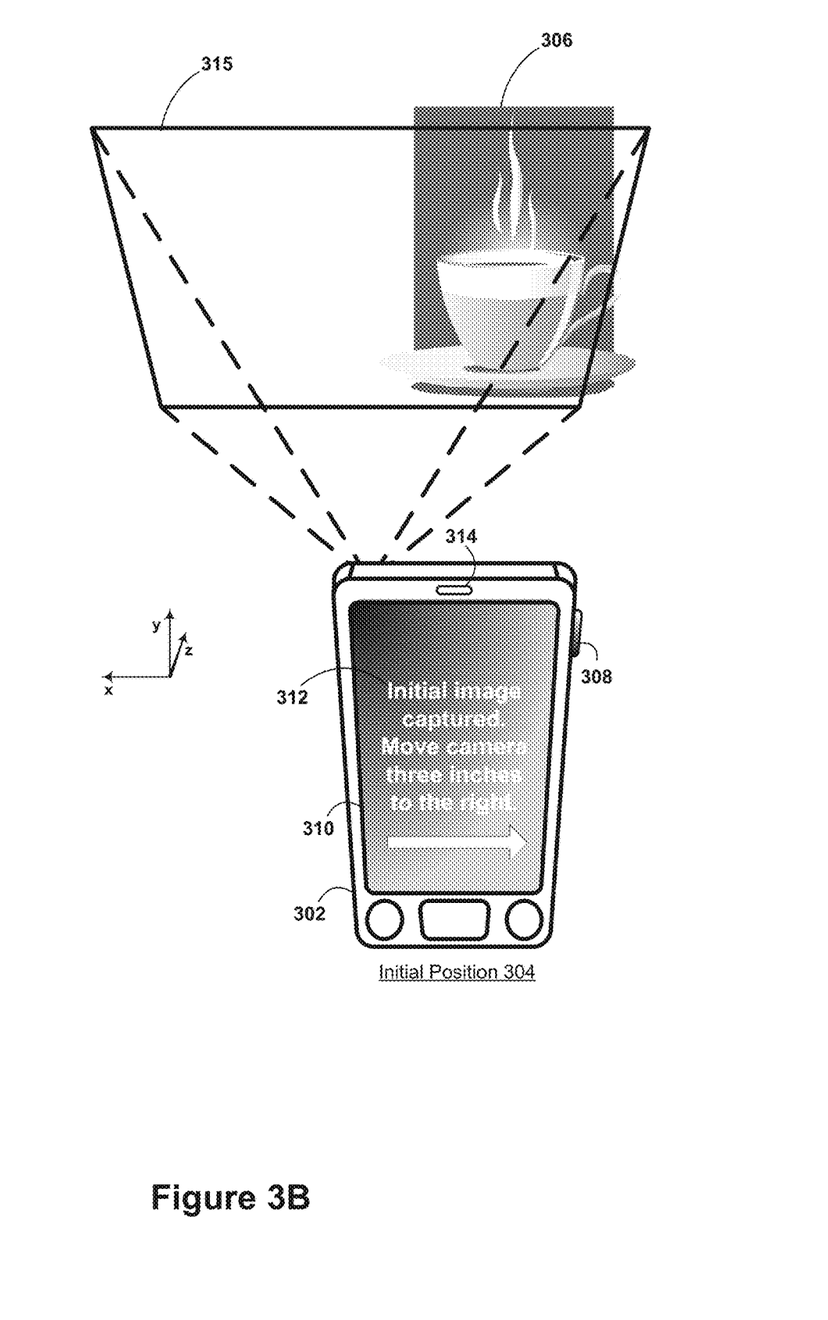
FIG. 3B is a perspective view of an image capture scenario in accordance with an example embodiment.

Following the capture of the initial image, step 406 includes determining an appropriate target displacement 316 from the initial position 304 for the desired stereoscopic effect. The determination could involve various data collected from the initial image, such as a potential target object, approximate distance to the potential target object, approximate size (height/width) of the potential target object, etc. The determination of the target displacement 316 could additionally or alternatively be based upon various conventions known in the art of stereography and as described above. Alternatively, the camera could be fixed to provide a single target displacement 316 for all situations (e.g. ~65 mm for ortho stereo images). Step 406 could be performed by the camera, the phone 302 generally, device 100, a server network in communication with the phone 302, or by some other type of device.

The target displacement 316 could be defined to be a length that is associated with a target direction that could be parallel to the plane of the image sensor, for instance. In such an instance, the camera could be moved to the left or right such that the camera remains parallel to the original field of view. In other embodiments, the target direction could depend upon various factors such as the 3-D characteristics of the target object and preferences of the user. For instance, the cup of coffee 306 may have a feature that should take prominence in the created stereoscopic image. The handle of the coffee cup, for example, may be of interest to the user. Accordingly, the target direction could be in a particular direction (such as a parallel angle in the direction of the cup handle) to better illustrate the element of interest in the created stereoscopic image. Alternatively, a default direction could be used for the target direction. For example, the target direction could be always to the right or to the left with respect to the target object.

Additionally, target directions are possible in directions other than those parallel to the plane of the image sensor or field of view. For instance, a target direction could include a directional component towards or away from the target object.

Depending upon the particular embodiment, the target direction could be determined in various ways. For instance, the target direction may be determined to be a default direction (e.g. right with respect to the target object). In other instances, the target direction could be determined automatically depending upon factors such as initial image composition. For example, the target direction could be determined in an effort to capture a candidate image where the target object is more centered that in the initial image. In various other embodiments, the target direction determination could additionally or alternatively depend upon the selected stereoscopic effect and/or other user preferences and selections.

Further, the target displacement 316 could be considered as a change to the relative position of the camera with respect to the target object. As such, one or both of the target object and the camera may move in order to fulfill a relative target displacement position. In other words, the camera need not move if the target object moves in the correct direction and to the relative target displacement location. For instance, a fixed camera may capture stereoscopic images of a car if that car moves with respect to the fixed camera. In such an example embodiment, a plurality of images that may include still or video images may be captured with the intent of identifying an initial image and a candidate image for the creation of a stereoscopic image.

In other instances, both the target object and the camera could move. For instance, using the previous moving car example, the camera mount could additionally move in an effort to fulfill the determined target displacement 316. If the relative distance between the target object and the camera nears or meets target displacement 316, the camera could attempt to capture a candidate image automatically. Tracking of the relative position of the target object with respect to the camera may be done, for example, by analyzing successive image frames to determine if the proper target displacement has been achieved. In other embodiments, the rangefinder 132 (and/or the gyroscope 128, the accelerometer 130, and the wireless communication interface 138) could be used to determine if the proper relative distance and direction between the target object and the camera has been obtained.

In addition to the relative distance and direction of the displacement between the camera and the target object, camera rotation may be taken into consideration. Slight rotational changes between successive camera frames could be used to display 3-D images and could thus be used in the context of this method.

Step 408 includes providing an instruction that specifies how to move the camera from the initial position. The instruction could include a graphical image and/or text on a display of the device and/or sound (e.g., spoken instructions, beeping or other sound) indicating the direction and distance of the target displacement 316. Alternatively, the instruction could be just a direction without reference to a specific distance. The instruction could be provided by the camera, the phone 302 generally, device 100, or by some other type of device.

Method steps 404 and 408 could also be described as shown in FIG. 3B. In the example embodiment, an initial image 315 could be captured by phone 302 in response to a user pushing shutter button 308. The initial image 315 may include the cup of coffee 306. Text could be displayed in display 310, such as, "Initial image captured." Furthermore, method step 406 could be carried out to determine a target displacement. In this case, since the cup of coffee 306 is in the right side of the initial image 315, the target direction could be determined to the right (in order to keep the target object within the field of view). In the example embodiment, the target displacement 316 could be determined to be three inches. Additionally, method step 408 could commence with text being displayed on display 310 directing the user to move the camera by the target displacement 316. For instance, the message, "Move camera three inches to the right," could be displayed. In response, the user could begin panning the camera to the right.

Method step 410 could include estimating the camera's displacement from the initial relative position. Step 410 could be performed by the controller 112, the camera, the phone 302, a server in communication with the phone 302, the device 100, or by some other type of device. This step could also involve a change in the relative distance between the target object and the camera. This step could be carried out dynamically, possibly using elements from the positioning system 104, with new displacement estimates possibly occurring several times per second until the target displacement 316 is reached.

In another embodiment, the controller 112 could include a motion detection engine. The motion detection engine could attempt to determine how far the device has moved using a variety of signals. The signals could include information from Wi-Fi/cellular signal triangulation, tilt/pan sensors, compass direction, GPS position, and camera image movement, among other possibilities. Specifically, camera image movement could be detected using motion vector calculations, which are known and used in art. Input to the motion detection engine from tilt/pan and other types of sensors could be used to determine the estimated camera displacement based on known algorithms for movement calculation.

Additionally or alternatively, in some embodiments the camera could capture multiple images while the relative position of the camera and target object changes. Based on these images, motion vectors could be calculated that may relate to a relative position change between image frames. The calculated motion vectors could then be used to estimate the camera's displacement from the initial position.

Method step 412 includes evaluating whether or not the actual/estimated displacement corresponds to the determined target displacement 316. As described above, the evaluation of the estimated displacement could be performed by the controller 112, which in turn may receive motion and/or location data from the positioning system 104.

Figure 3C:
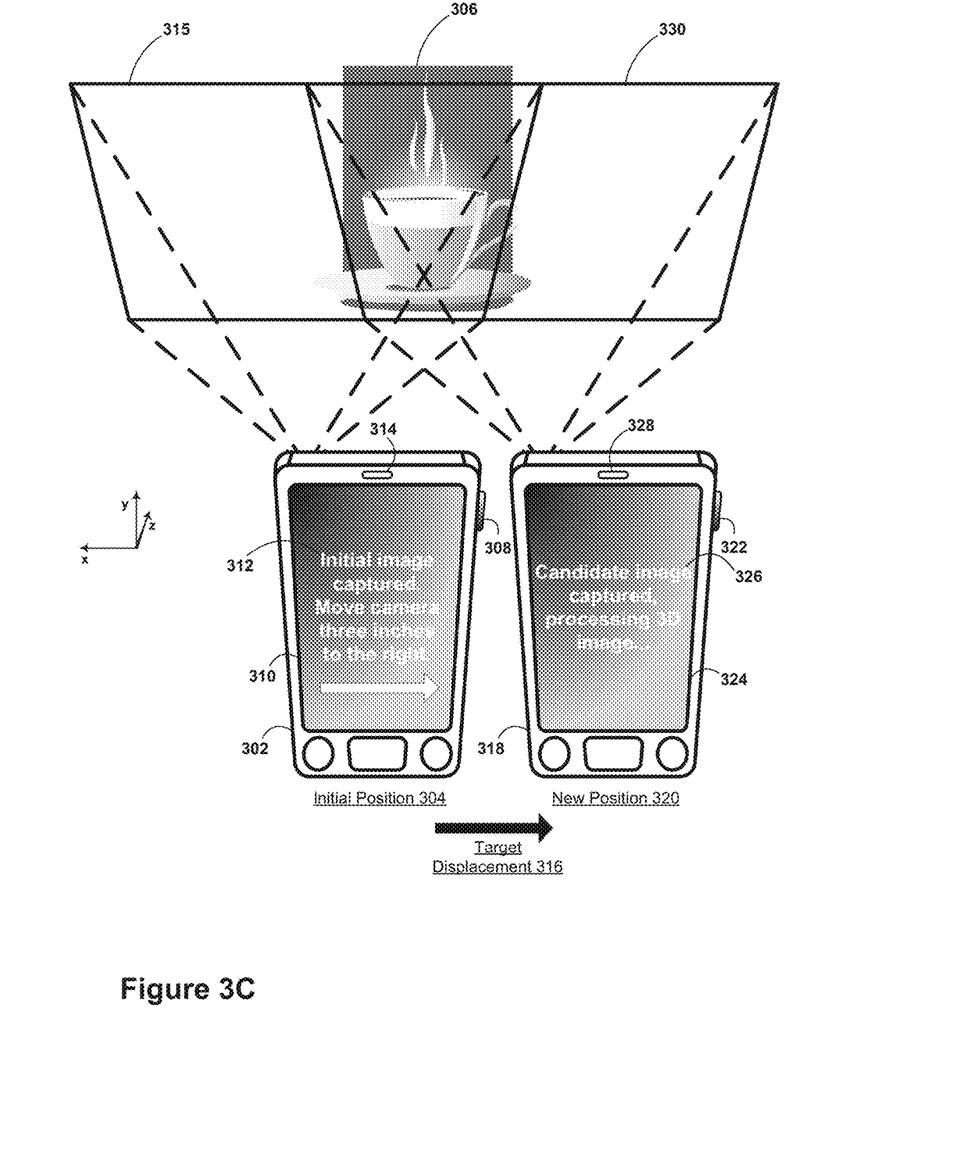
FIG. 3C is a perspective view of an image capture scenario in accordance with an example embodiment.

Method step 414 provides that once the target displacement 316 is achieved and the camera is at the new position 320, the camera is controlled to automatically capture a candidate image 330.

Thereafter, method step 416 includes analyzing the candidate image 330 for image quality and similarity to the initial image. As described above, several different criteria could be used for evaluating the image quality of the candidate image 330. For instance, the focus and exposure may be evaluated to determine if the candidate image 330 meets acceptable image quality. Acceptable image quality could incorporate several image quality metrics based on image characteristics known in the art such as focus, exposure, image composition, among other characteristics. For example, if the image quality metrics of the candidate image 330 are found to satisfy predetermined image quality criteria, then the candidate image 330 may be determined to have acceptable image quality.

Further, method step 416 includes an evaluation of the image similarity to determine if the candidate image exhibits acceptable similarity to the initial image. Acceptable similarity to the initial image could include the presence of the target object in both the initial and candidate images as well as similar background features in both images, among other possibilities. If, after such comparisons, the candidate image 330 is found to satisfy predetermined image similarity criteria, then the candidate image 330 may be determined to have acceptable similarity to the initial image.

In some embodiments, a predicted image could be created based on the initial image and the target displacement. Further, the candidate image 330 could be compared to the predicted image as part of the image similarity evaluation. For instance, a predicted image may be generated based on the initial image that takes into account a predicted perspective shift due to the device moving to the target displacement.

Both acceptable image quality and acceptable similarity to the initial image criteria could be adjusted dynamically due to various factors, such as ambient light level (slight motion blur due to longer shutter speeds may be acceptable), depth of field (large portions of the image may be out of focus due to narrow depth of focus), and target object/background motion (when tracking a moving target object, the background may appear motion-blurred while the target object may remain in relatively sharp focus). Step 416 could be performed by the device 100, the phone 302, by a server in communication with the phone 302, or by some other type of device.

Alternatively, an image processing engine could determine the quality of the as-captured candidate image 330 using standard image quality metrics, and also compare the candidate image 330 to a previously captured image frame. Thus, the image processing engine could include a 2D image quality engine and a 3D similarity engine.

The 2D image quality engine could evaluate image quality based on known methods in the art. Some examples of 2D image quality metrics include blur detection, camera signal-to-noise ratio, and edge detection.

The 3D similarity engine could use a previously captured image frame (e.g., the initial image, an intervening image between the initial image and the candidate image, or a reference image) to determine the usability of the candidate image 330. For instance, a motion vector could be calculated between the previously captured image frame and the candidate image 330. Additionally, in some embodiments, motion vector calculation could incorporate sensor data or other data that could relate to the movement of the camera. In such embodiments, a suitable image transform could be applied to any of the considered images (e.g., to form a predicted image) for use in the image comparison. Further, colors between compared images could be substantially similar. Thus, a similarity value could be computed based, for instance, on color histograms of the respective images. In yet another embodiment, 2D-to-3D image conversion could be performed on the initial image to determine an approximate basis for comparison for the candidate image 330.

If the image quality and/or the image similarity is insufficient, method step 422 serves to provide a further instruction. The further instruction could include an action required of the user of device 100 or could be an automatic response by device 100 in response to insufficient image quality and/or image similarity. For example, the further instruction could include a message for the user to acquire a different candidate image. Alternatively, the further instruction could require the user to acquire a new initial image. The further instruction may also take the form of an automatic capture of a new initial image and/or a new candidate image. For instance, after an initial image is captured and as device 100 is moving towards the target displacement location, image capture system 102 could be configured to acquire a succession of images, each image of which could be evaluated as a candidate image. As respective candidate images are analyzed and found deficient, the further instructions could include the capture of a new candidate image. The succession of image captures (and the further instructions) may stop when a candidate image is deemed acceptable. Alternatively, the succession of image captures may continue by assigning a subsequent image as an initial image.

In one embodiment, if the system determines that the captured image is not of high-enough quality, for instance because the camera is moving too fast and blurring the image, the system could indicate to the user, through audio, visual, and/or haptic vibration feedback that they need to recapture a new candidate image 330.

If, as in method step 420, the candidate image 330 has both acceptable image quality and acceptable image similarity, a stereoscopic image is created based on the initial image and candidate image. Information could be provided to the user via, for instance, the display 324 to confirm an acceptable candidate image has been acquired. For instance, as shown in FIG. 3C, text could be displayed on the display 324 stating, "Candidate image captured, processing 3D image . . ." The stereoscopic image could be created by the camera, the image capture system 102, the device 100, and/or a server network.

The aforementioned method could be carried out in a recurring way such that 3-D images are generated on a continuous basis or during specific times. The method could further be implemented using a video camera that may capture images at video frame rates, such as 120 frames per second or higher. In such an embodiment, the video camera could continuously capture images, each of which could be considered to be an 'initial image' and/or a 'candidate image'. For instance, in an example embodiment, a video camera could capture video frames A, B, and C. In such an embodiment, video frame A could be considered an 'initial image' and video frame B could be evaluated as a 'candidate image'. If video frame B is found to be acceptable, a 3-D image could be generated from the combination of video frames A and B. Subsequently, video frame B could be considered an 'initial image' and video frame C could be considered as the new 'candidate image'. Alternatively, video frames B and C could be considered serially or in parallel as candidate images for video frame A. In other words, multiple candidate images could be considered while the camera is moving towards the new location 320. Other ways of applying video imagery to create 3-D stereographic images are possible and will be evident to one skilled in the art. These alternate embodiments are each considered and should be included within the scope of the described invention.

Although the above method relates to stereoscopy, or the combination of two 2-D images to form a pseudo-3-D image, similar methods are implicitly contemplated herein that may include methods involving the combination of more than two 2-D images. Such methods, also known as multiscopy, may combine multiple images from different positions and/or angles. This may allow the viewer to move around the target object to see it from different 3-D perspectives. As such, one skilled in the art will understand that a succession of initial and candidate images could be combined in such a way within the context of this invention as to create a multiscopic image.

Non-Transitory Computer Readable Medium with Instructions for Automatic 3-D Image Creation Some or all of the functions described above and illustrated in FIGS. 3A, 3B, 3C, and 4 may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. The computing device that executes the stored instructions could be a device such as the device 100 illustrated in FIG. 1 and the non-transitory computer readable medium may correspond to the memory 114. Alternatively, the computing device that executes the stored instructions could be another computing device, such as a server in a server network.

The non-transitory computer readable medium (e.g. memory 114) may store instructions executable by the controller 112 to perform various functions. For instance, the controller 112 may be instructed to control image capture system 102 to capture an initial image. The controller 112 may be further instructed to determine a target displacement to move the camera for a suitable 3-D effect. Other instructions may direct the controller 112 to provide various messages to the user that may direct the user to move the camera by the determined target displacement to capture the candidate image. The controller 112 may be further instructed to capture the candidate image. The controller 112 and memory 114 may further interact to determine if the initial and candidate images are suitable for stereoscopic 3-D image creation. If the initial and candidate images are not fully compliant with image quality and image similarity criteria, various instructions could direct controller 112 to perform other actions, such as capture another candidate image. Finally, upon acceptable candidate image capture, controller 112 may be instructed to create the stereoscopic 3-D image.

CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for image creation, the method comprising:
receiving, by a system comprising a hardware processor, a first two-dimensional image;
comparing, by the system, the first two-dimensional image to a second two-dimensional image to determine whether the first two-dimensional image has a given similarity to the second two-dimensional image, wherein the given similarity is determined by combining at least the first two-dimensional image and the second two-dimensional image and determining whether a desired stereoscopic effect resulting from the combined first two-dimensional image and second two-dimensional image falls within a range of the desired stereoscopic effect and whether an image composition of the combined first-two dimensional image and the second two-dimensional image has changed; and
in response to the comparison determining that the first two-dimensional image has at least the given similarity to the second two-dimensional image based on the desired stereoscopic effect falling within the range of the desired stereoscopic effect and based on the image composition, generating, by the system, a three-dimensional image that combines at least the first two-dimensional image and the second two-dimensional image.

2. The method of claim 1, further comprising analyzing the first two-dimensional image to determine whether the first two-dimensional image has an image quality meeting a pre-determined threshold, wherein the three-dimensional image is generated in response to determining that the first two-dimensional image has an image quality meeting the pre-determined threshold and has the given similarity to the second two-dimensional image.

3. The method of claim 1, wherein at least one of the first two-dimensional image and the second two-dimensional image is part of a set of images of a video.

4. The method of claim 1, further comprising determining whether a level of three-dimensional effect associated with the combination of the first two-dimensional image and the second two-dimensional image satisfies a defined threshold level of three-dimensional effect.

5. The method of claim 1, further comprising:
capturing the second two-dimensional image at an initial position using an image capture device;
determining a target displacement from the initial position;
determining a displacement of the image capture device from the initial position; and
in response to determining that the displacement of the image capture device corresponds to the target displacement, initiating capture of an additional two-dimensional image by the image capture device.

6. The method of claim 1, further comprising:
generating a predicted two-dimensional image based on the second two-dimensional image and the target displacement; and
comparing the first two-dimensional image to the predicted image.

7. A system for image creation, the system comprising:
a hardware processor that is configured to:
receive a first two-dimensional image;
compare the first two-dimensional image to a second two-dimensional image to determine whether the first two-dimensional image has a given similarity to the second two-dimensional image, wherein the given similarity is determined by combining at least the first two-dimensional image and the second two-dimensional image and determining whether a desired stereoscopic effect resulting from the combined first two-dimensional image and second two-dimensional image falls within a range of the desired stereoscopic effect and whether an image composition of the combined first-two dimensional image and the second two-dimensional image has changed; and in response to the comparison determining that the first two-dimensional image has at least the given similarity to the second two-dimensional image based on the desired stereoscopic effect falling within the range of the desired stereoscopic effect and based on the image composition, generate a three-dimensional image that combines at least the first two-dimensional image and the second two-dimensional image.

8. The system of claim 7, wherein the hardware processor is further configured to analyze the first two-dimensional image to determine whether the first two-dimensional image has an image quality meeting a pre-determined threshold, wherein the three-dimensional image is generated in response to determining that the first two-dimensional image has an image quality meeting the pre-determined threshold and has the given similarity to the second two-dimensional image.

9. The system of claim 7, wherein at least one of the first two-dimensional image and the second two-dimensional image is part of a set of images of a video.

10. The system of claim 7, wherein the hardware processor is further configured to determine whether a level of three-dimensional effect associated with the combination of the first two-dimensional image and the second two-dimensional image satisfies a defined threshold level of three-dimensional effect.

11. The system of claim 7, wherein the hardware processor is further configured to:
capture the second two-dimensional image at an initial position using an image capture device;
determine a target displacement from the initial position;
determine a displacement of the image capture device from the initial position; and
in response to determining that the displacement of the image capture device corresponds to the target displacement, initiate capture of an additional two-dimensional image by the image capture device.

12. The system of claim 7, wherein the hardware processor is further configured to:
generate a predicted two-dimensional image based on the second two-dimensional image and the target displacement; and
compare the first two-dimensional image to the predicted image.

13. A non-transitory computer-readable medium containing computer executable instructions that, when executed by a processor, cause the processor to perform a method for image creation, the method comprising:
receiving a first two-dimensional image;
comparing the first two-dimensional image to a second two-dimensional image to determine whether the first two-dimensional image has a given similarity to the second two-dimensional image, wherein the given similarity is determined by combining at least the first two-dimensional image and the second two-dimensional image and determining whether a desired stereoscopic effect resulting from the combined first two-dimensional image and second two-dimensional image falls within a range of the desired stereoscopic effect and whether an image composition of the combined first-two dimensional image and the second two-dimensional image has changed; and
in response to the comparison determining that the first two-dimensional image has at least the given similarity to the second two-dimensional image based on the desired stereoscopic effect falling within the range of the desired stereoscopic effect and based on the image composition, generating a three-dimensional image that combines at least the first two-dimensional image and the second two-dimensional image.

14. The non-transitory computer-readable medium of claim 13, wherein the method further comprises analyzing the first two-dimensional image to determine whether the first two-dimensional image has an image quality meeting a pre-determined threshold, wherein the three-dimensional image is generated in response to determining that the first two-dimensional image has an image quality meeting the pre-determined threshold and has the given similarity to the second two-dimensional image.

15. The non-transitory computer-readable medium of claim 13, wherein at least one of the first two-dimensional image and the second two-dimensional image is part of a set of images of a video.

16. The non-transitory computer-readable medium of claim 13, wherein the method further comprises determining whether a level of three-dimensional effect associated with the combination of the first two-dimensional image and the second two-dimensional image satisfies a defined threshold level of three-dimensional effect.

17. The non-transitory computer-readable medium of claim 13, wherein the method further comprises:
capturing the second two-dimensional image at an initial position using an image capture device;
determining a target displacement from the initial position;
determining a displacement of the image capture device from the initial position; and
in response to determining that the displacement of the image capture device corresponds to the target displacement, initiating capture of an additional two-dimensional image by the image capture device.

18. The non-transitory computer-readable medium of claim 13, wherein the method further comprises:
generating a predicted two-dimensional image based on the second two-dimensional image and the target displacement; and
comparing the first two-dimensional image to the predicted image.

* * * * *